United States Patent [19]
Morris

[11] 3,857,302
[45] Dec. 31, 1974

[54] TRANSMISSION AND SPEED CONTROLLED LOCK-UP CLUTCH

[75] Inventor: Hugh C. Morris, Peoria, Ill.

[73] Assignee: Caterpillar Tractor Co., Peoria, Ill.

[22] Filed: June 25, 1973

[21] Appl. No.: 373,245

[52] U.S. Cl.............. 74/733, 192/3.3, 192/3.57, 192/103 F
[51] Int. Cl............. F16h 45/02, B60k 21/00
[58] Field of Search............ 192/3.3, 3.57, 3.33; 74/733

[56] References Cited
UNITED STATES PATENTS

| | | | |
|---|---|---|---|
| 3,126,988 | 3/1964 | Memmer | 192/3.57 |
| 3,262,523 | 7/1966 | Gordon | 192/3.29 |
| 3,621,955 | 11/1971 | Black | 192/3.33 |
| 3,682,043 | 8/1972 | Bailey | 192/3.57 |
| 3,719,093 | 3/1973 | Edmunds | 192/3.3 |

*Primary Examiner*—Benjamin W. Wyche
*Attorney, Agent, or Firm*—Phillips, Moore, Weissenberger, Lempio & Strabala

[57] ABSTRACT

A control valve for a lock-up clutch in a transmission assembly including a torque converter normally coupling a power input member with a transmission speed ratio section, the lock-up clutch being operable to effectively bypass the torque converter, the control valve being differentially responsive to fluid pressure from a speed sensing means to maintain the clutch in either positive engagement or positive disengagement. The control valve is also adapted to provide for both engaged and disengaged operation of the clutch while the transmission speed ratio section is conditioned for operation in a selected speed ratio, the control valve being effective to maintain the clutch in a disengaged condition during relatively lower speed gear settings and to maintain the clutch in an engaged condition during relatively higher speed gear settings, the control valve further providing for disengagement of the clutch during each shift between the speed gear settings.

10 Claims, 6 Drawing Figures

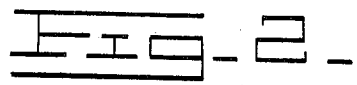
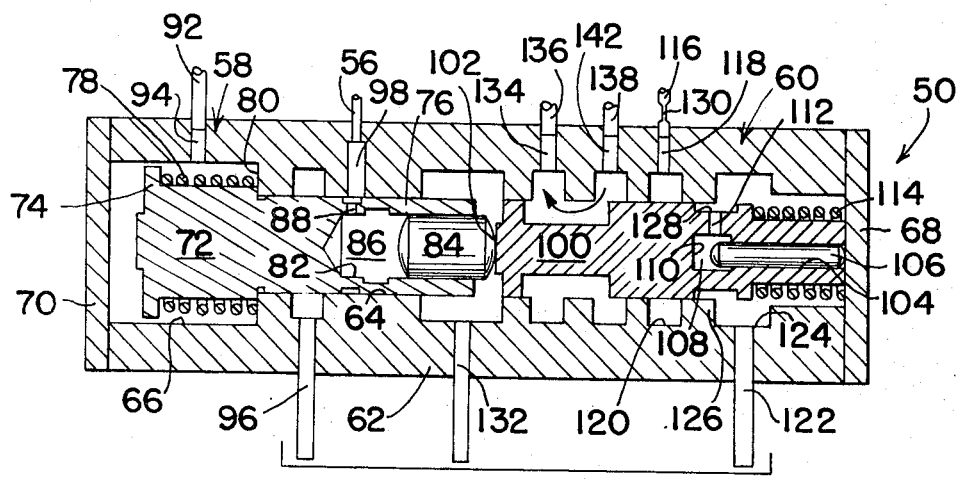
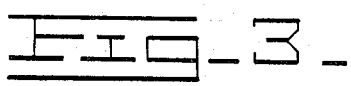
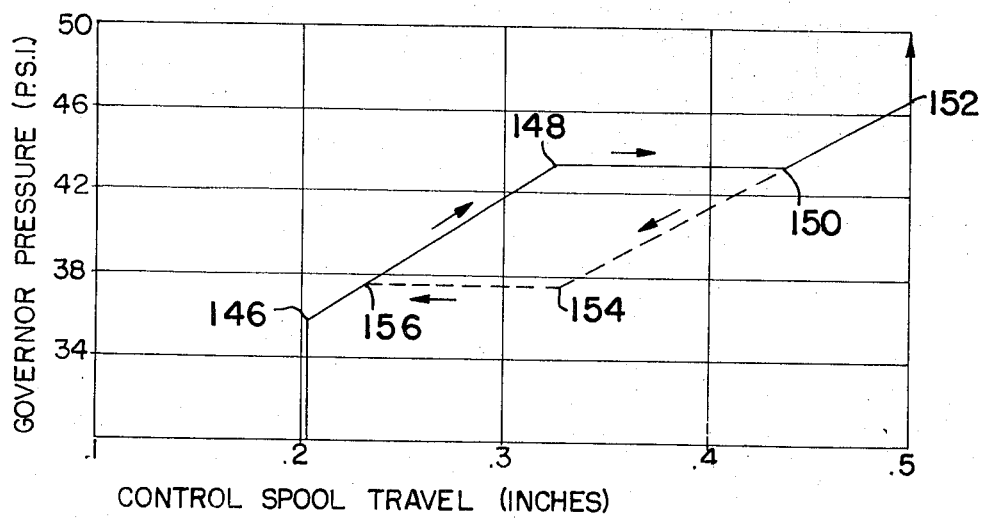

| | CLUTCH ENGAGED |
|---|---|
| REV. | 1 and 7 |
| NEU. | 4 |
| 1 | 1 and 6 |
| 2 | 3 and 6 |
| 3 | 2 and 6 |
| 4 | 3 and 5 |
| 5 | 2 and 5 |
| 6 | 3 and 4 |
| 7 | 2 and 4 |
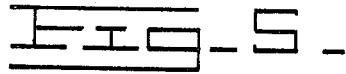
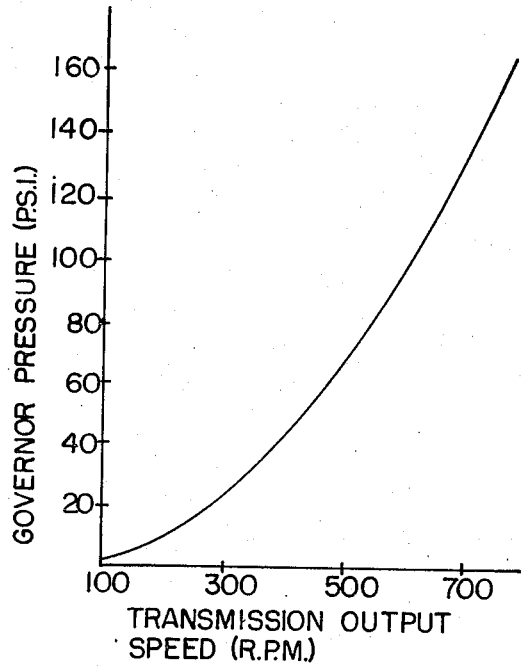
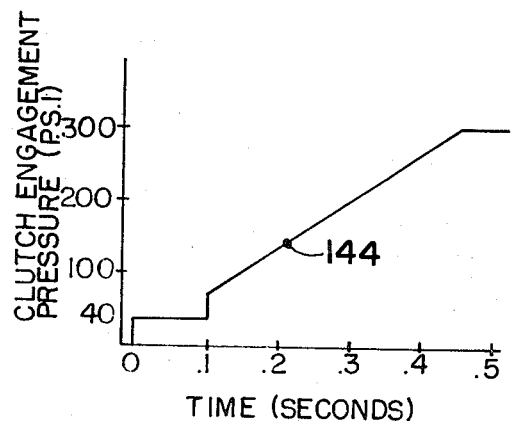
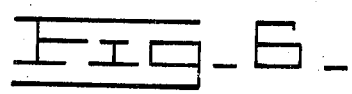

TRANSMISSION AND SPEED CONTROLLED LOCK-UP CLUTCH

BACKGROUND OF THE INVENTION

The present invention relates to control valve means for operating a lock-up clutch associated with a torque converter in a transmission assembly. More particularly, the control valve means is adapted to regulate engagement and disengagement of the clutch depending upon various operating conditions.

The transmission assembly providing a setting for the present invention is contemplated for use preferably in vehicle power trains. In such applications, it is desirable to employ the torque converter as a fluid connection particularly in relatively low speed gears in order to provide maximum power to a primary output shaft which may be coupled for example to ground wheels of the vehicle. The lock-up clutch is provided to permit bypassing of the torque converter so that a power input shaft in the power train is effectively coupled directly to a transmission speed ratio section to provide greater operating efficiency.

SUMMARY OF THE INVENTION

The present invention is particularly concerned with a control valve assembly for regulating engagement and disengagement of such a lock-up clutch associated with a torque converter in a transmission assembly. The control valve is particularly adapted to regulate engagement and disengagement of the lock-up clutch in response to various operating conditions. Initially, the control valve is particularly adapted to positively maintain the clutch in an engaged or disengaged condition in order to eliminate or minimize a condition commonly referred to as "hunting" wherein the clutch tends to rapidly oscillate between an engaged condition and a disengaged condition.

The control valve is also particularly adapted to provide for more efficient operation of the transmission assembly as it is shifted through a plurality of successive speed gear settings. In particular, the control valve is adapted to provide for both engaged and disengaged operation of the clutch in a selected speed gear setting while being maintained in an engaged condition in higher speed gear settings in order to maintain the more efficient direct coupling between a power input means of the transmission assembly and the transmission speed ratio section.

The control valve is further adapted to maintain the lockup clutch in a disengaged condition in relatively lower speed gear settings in order to provide increased torque delivery through the transmission assembly in those speed gear settings.

Still further, the control valve is adapted to regulate disengagement and reengagement of the lock-up clutch in order to cushion the energy of shifts between gears or speed ratios in the transmission speed ratio section. For this purpose, the lock-up clutch is disengaged during each shift so that the fluid connection provided by the torque converter acts as a cushion at least until the shift is completed.

In accomplishing many of the functions set forth above, the control valve is responsive to a fluid signal from a speed sensing means which provides for pressure variation in the fluid signal in proportion to rotating speed of a member in the transmission assembly. The control valve is further adapted to limit maximum flow of the fluid signal from the speed sensing means for the purposes described above, since the fluid signal from the speed sensing means may also be employed for other control purposes which are not a subject of this invention.

Additional objects and advantages of the invention are made apparent in the following description having reference to the accompanying drawings.

DESCRIPTION OF THE DRAWINGS

FIG. 2 is a fragmentary view, with parts in section, of the control valve assembly in a different operating condition.

FIG. 3 graphically represents pressure of a speed responsive fluid signal in comparison with movement of a control spool within the control valve assembly.

FIG. 4 is a tabular representation of selected clutches in the transmission speed ratio sections which are engaged in the illustrated combinations to establish a plurality of speed gear settings.

FIG. 5 is a graphical representation of pressure variation in the speed responsive signal compared to rotating speed of a member in the transmission assembly.

FIG. 6 is a graphical representation of a modulated fluid pressure established within the transmission speed ratio section as a function of time.

DESCRIPTION OF A PREFERRED EMBODIMENT

Figure 1:
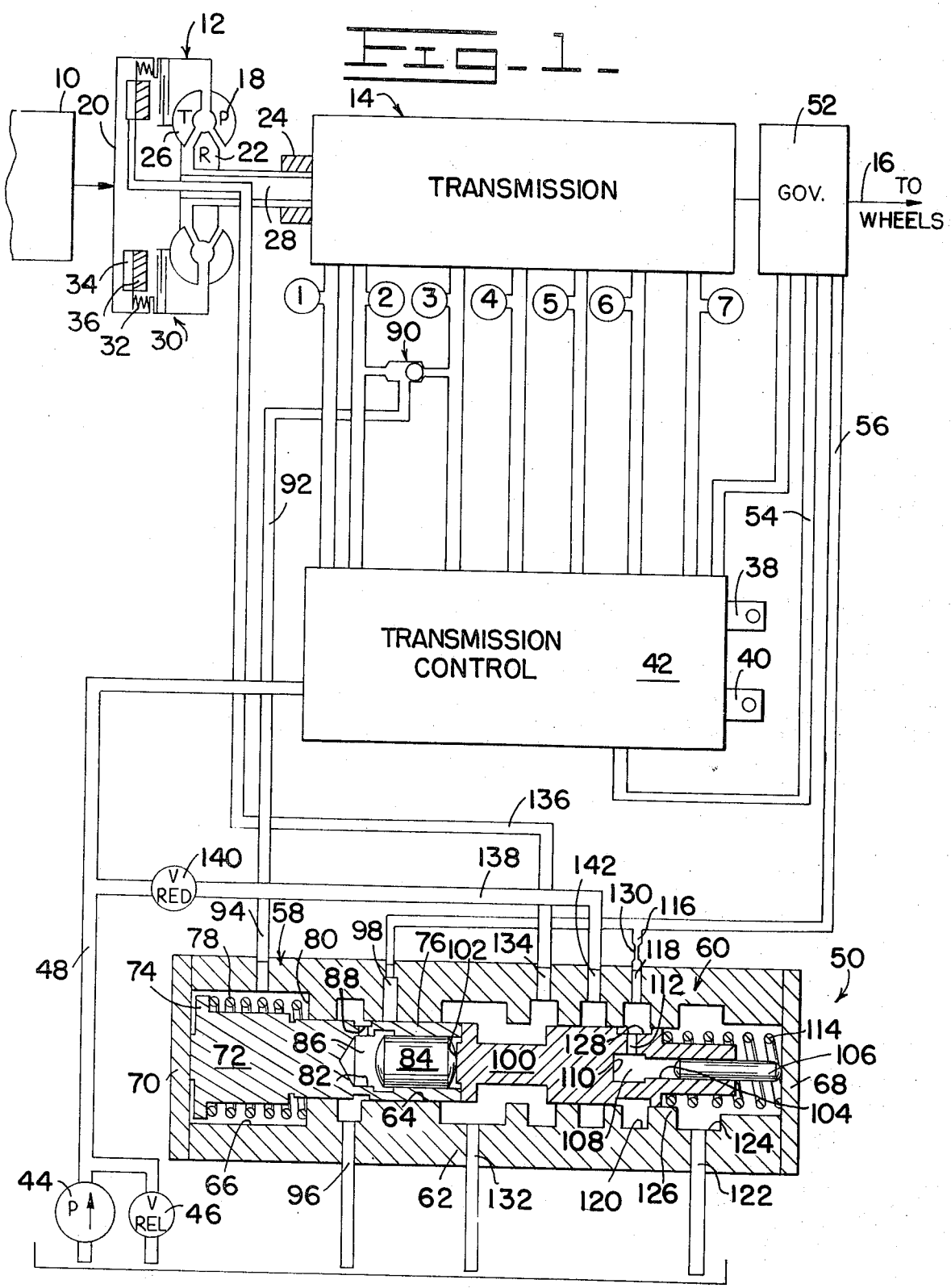
FIG. 1 is a schematic representation of a transmission assembly, a control valve assembly for regulating a lock-up clutch in the transmission assembly being illustrated with parts in section.

A transmission assembly is illustrated in FIG. 1 for use in a drive train of a vehicle, preferably a material handling vehicle such as an earth-moving truck, for example. The transmission assembly includes a prime mover or engine 10 with a torque converter 12 and a planetary-type transmission speed ratio section 14 arranged in series between the engine and an output shaft 16 which may be connected to driven ground wheels of the vehicle (not shown).

The torque converter includes an impeller 18 which is directly coupled through a power input 20 with the engine 10. The power input 20 may for example be a rotating housing for the torque converter. The torque converter also includes a reactor element 22 which may be connected to a stationary housing 24 of the transmission speed ratio section either directly as illustrated in FIG. 1 or indirectly through a conventional over-running clutch (not shown). A turbine element 26 in the torque converter is directly coupled with an input shaft 28 of the transmission section 14.

A lock-up clutch 30 is conventionally associated with the torque converter and includes a plurality of springs 32 tending to maintain the clutch in a disengaged condition. Hydraulic fluid pressure in an actuating chamber 34 acts upon an actuating piston 36 to engage the lock-up clutch, thereby coupling the turbine element 26 directly with the input member 20 and accordingly with the engine 10. With the clutch 30 being disengaged, the torque converter 12 is, of course, effective to provide a fluid coupling between the engine 10 and the transmission speed ratio section 14.

The transmission section 14 is of a generally conventional power-shift type including a plurality of clutches which are schematically illustrated in FIG. 1 and sequentially identified by reference numerals 1–7, both in FIG. 1 and in the table of FIG. 4. The clutches 1–7 are engageable in the predetermined combinations shown by FIG. 4 to provide a series of gear gear settings or speed ratios within the transmission section 14. The clutches 1–7 are hydraulically actuated by manipulation of a speed selector spool 38 and a directional selector spool 40 in a transmission control valve assembly 42.

The transmission control valve assembly 42 receives fluid under pressure from a pump or source 44 at a predetermined maximum pressure established by a relief valve 46, the pump 44 and relief valve 46 being in communication with the transmission control valve 42 through a fluid conduit 48.

Referring momentarily to FIG. 4, the transmission section 14 is preferably designed to maintain engagement of the lock-up clutch 30 within each of the higher speed gear settings indicated by the numerals 3–7. It may be noted that at least one of the clutches 2 and 3 is actuated for establishing each of the higher speed gears. Accordingly, the steps between these successive speed gears are relatively narrow to facilitate the more efficient mode of operation where the engine 10 is directly coupled with the transmission section 14 for each of those speed gears.

The second forward speed gear settings identified by the numeral 2 in FIG. 4 and established by actuation of clutches 3 and 6 is preferably contemplated to employ the lock-up clutch in both an engaged and disengaged condition to allow somewhat broader steps between the first, second and third forward speed gears. It is still further contemplated in conjunction with the present invention that all reverse gears, neutral gear and first gear forward employ the lock-up clutch only in a disengaged condition to provide increased torque transmission through the torque converter 12.

A control valve assembly 50 adapted to accomplish these various functions is described in greater detail below.

The transmission assembly also includes a speed sensitive governor 52 connected to the output shaft 16 of the transmission section 14. The governor 52 receives fluid from the transmission control valve 42 by means of a supply conduit 54 and communicates a fluid signal through a conduit 56 to the control valve assembly 50 in a manner described in greater detail below. The fluid signal in the conduit 56 varies, of course, in direct proportion to rotating speed of the output shaft 16 as is graphically represented in FIG. 5.

The lock-up clutch control valve assembly 50 includes a preconditioning valve 58 and a control valve 60 arranged within a common valve housing 62. The housing 62 defines a primary bore 64 with an enlarged bore 66 being formed in the preconditioning portion of the housing. Opposite ends of the bores 64 and 66 are closed by end covers 68 and 70 respectively.

The preconditioning valve 58 includes a cylindrical spool 72 with a flange 74 formed adjacent the end cover 70 and a cylindrical extension 76 of reduced diameter which mates with primary bore 64. A spring 78 interacts between the flange 74 and a shoulder 80 formed between the bores 64 and 66 to urge the preconditioning spool 72 leftwardly against the end cover 70.

The spool extension 76 is formed with a counterbore 82 within which a biasing piston 84 is arranged to form a closed fluid chamber 86. The chamber 86 is in communication with the bore 64 by means of a radial passage 88 formed in the spool extension.

The enlarged bore 66 is in effective fluid communication with the clutches numbered 2 and 3 by means of a shuttle valve 90, a conduit 92 and a passage 94 formed in the housing 62. Accordingly, it may be seen that fluid under pressure is introduced into the enlarged bore 66 whenever any of the second through seventh forward speed gears is established within the transmission speed ratio section 14 (also see FIG. 4). The spool 72 is thereby urged in a rightward direction as viewed in FIG. 1 until it contacts the shoulder 80 whereupon the radial passage 88 is blocked from communication with the drain passage 96 and placed in communication with the conduit 56 by means of a passage 98 formed in the valve housing 62. The fluid signal from the governor 52 is then communicated into the chamber 86 for a purpose described in greater detail below.

The control valve 60 includes a control spool 100 movably arranged within the bore 64. The spool is formed with annular grooves and interposed lands to regulate fluid communication across the bore 64. The spool 100 also has an end surface 102 arranged for engagement with the piston 84. The other end of the spool 100 forms a counterbore 104 in which a reaction piston 106 is slidably arranged to form a reaction chamber 108. It is to be particularly noted that fluid pressure in the chamber 108 acts upon an effective area of end surface 110 which is relatively small compared to the cross-sectional area of the piston 84. This differential relation of surfaces provides a particularly important feature of the present invention as is described in greater detail below. The chamber 108 is in communication with the bore 64 by means of a radial passage 112 formed in the spool 100. The control spool 100 is urged in a leftward direction as viewed in FIG. 1 by a spring 114 interacting between the spool and the end cover 68.

The spool 100 is illustrated in FIG. 1 in a position where the chamber 108 is in communication with the conduit 56 by means of a branch conduit 116, a passage 118, and an annular recess 120 formed around the bore 64. The spool 100 tends to be maintained in that position by the spring 114. The spool 100 is also movable in a rightward direction to a position illustrated in FIG. 2 where the chamber 108 and passage 112 are in communication with a drain passage 122. Movement of the spool toward this position is initiated by operation of the preconditioning valve 58 as described in greater detail below.

The drain passage 122 is in communication with the bore 64 by means of an annular recess 124. The width of a land 126 formed between the annular recesses 120 and 124 is slightly less than an annular groove 128 formed by the spool 100 for communicating the passage 112 with the bore 64. A restrictive orifice 130 is accordingly formed in the conduit 116 to limit fluid flow from the conduit 56 into the drain passage 122 when spool 100 is positioned with its annular groove 128 generally in axial alignment with the land 126.

The valve housing 62 also has another drain passage 132 and a passage 134 which is in communication with the actuating chamber 34 of the clutch 30 by means of a conduit 136. When the spool 100 is shifted to the left, as illustrated in FIG. 1, the conduit 136 and the clutch 30 are in communication with the drain passage 132 to ensure disengagement of the clutch. As the spool 100 is shifted rightwardly into the position illustrated in FIG. 2, the conduit 136 and the clutch 30 are conditioned to receive fluid under pressure from the pump 44 by means of a branched conduit 138 including a conventional reducing valve 140 and a passage 142 communicating the conduit 138 with the bore 64.

Before describing a preferred mode of operation for the present invention, it is noted that the transmission control valve 42 is of a conventional type for modulating fluid pressure communicated to the clutches 1–7 in the transmission speed ratio section 14. The modulation rate for fluid so communicated to the clutches 1–7 is graphically illustrated in FIG. 6. Accordingly, when either of the clutches 2 or 3 is actuated, the shuttle valve 90 and conduit 92 serve to communicate the modulated fluid pressure of FIG. 6 to the enlarged bore 66 in the preconditioning valve 58.

The preferred mode of operation for the present invention is described below first as to operation with the transmission speed ratio section 14 conditioned for operation in reverse, neutral or first speed gear forward. Each of these gears, referring to the above description and FIG. 4, is established without actuating either of the clutches 2 and 3. Accordingly, the control spool 100 is maintained in the position illustrated in FIG. 1 by the spring 114. Further, the actuating chamber 34 for the lock-up clutch 30 is in communication with the drain passage 132, thus assuring that the lock-up clutch remains disengaged during each of these gear settings. Accordingly, the engine 10 is coupled with the transmission speed section 14 only through the torque converter 12 to provide maximum torque transmission.

The preconditioning valve 58 functions in a similar manner when the transmission speed ratio section 14 is conditioned for operation in any of the second through seventh forward speed gears (See FIG. 4). In particular, one of the clutches 2 and 3 is actuated for each of these speed gears with fluid pressure accordingly being transmitted through shuttle valve 90 and conduit 92 to the enlarged bore 66 in the preconditioning valve 58. Referring momentarily to FIG. 6, it may be seen that the transmitted pressure is approximately 300 psi, for example, as established by the relief valve 46, when the transmission speed ratio section is in steady-state operation. During transient conditions, as pressure increases in a manner illustrated by FIG. 6, the preconditioning spool is shifted rightwardly against the shoulder 80 at an intermediate pressure represented, for example, at point 144 in FIG. 6. As the spool 72 assumes the position illustrated in FIG. 2, its chamber 86 is blocked from communication with the drain passage 96 and placed in communication with the fluid signal from the governor 52 entering the preconditioning valve through the passage 98. As the spool 72 moves rightwardly, it shifts the spool 100 in a rightward direction because of the abutting engagement between the spools 72 and 100. In this manner, the spool 100 is shifted rightwardly approximately 0.2 inches before fluid pressure develops in the chamber 86 (see FIG. 3). Thereafter, fluid pressure in the chamber 86 acts upon the piston 84 and shifts the control spool 100 even further to the right away from the spool 72. Motion of the spool 100 is illustrated in FIG. 3.

With increasing rotational speed of the transmission output shaft 16, an increasing fluid signal is communicated into the chamber 86 from the governor 52. At an intermediate pressure of approximately 36 psi, for example, the control spool 100 begins to be shifted rightwardly out of abutting engagement with the spool 72. This point is represented in FIG. 3 at 146. Referring momentarily to FIG. 5, it may be seen that this pressure corresponds generally to a rotational speed for the output shaft 16 of approximately 370 rpm. As vehicle speed and the governor pressure in the conduit 56 further increase, the control spool 100 is shifted rightwardly against the spring 114 and pressure in the reaction chamber 108. As the spool 100 approaches a position indicated at 148 in FIG. 3, the chamber 108 passes out of communication with the annular recess 120 and begins to enter into communication with the annular recess 124 and the drain passage 122. Accordingly, further movement of the spool beyond that point eliminates fluid pressure within the reaction chamber 108, rightward movement of the spool 100, then being resisted only by the spring 114. Accordingly, the spool 100 immediately shifts rightwardly to a point indicated at 150 in FIG. 3. A further increase in operating speed of the output shaft 16 results in additional movement of the spool 100 to the right until it abuts the end cover 68 as illustrated in FIG. 2 and as denoted at point 152 in FIG. 3.

With operating speed of the output shaft 16 subsequently diminishing, the spool 100 is urged in a leftward direction by the spring 114 alone. Accordingly, the spool shifts leftwardly until it approaches a position indicated at 154 at FIG. 3. At that point, the chamber 108 is again placed in communication with the annular recess 120 so that the fluid signal of the conduit 56 enters the chamber 108. Fluid pressure acting upon the effective area of surface 110 in combination with force of the spring 114 rapidly shifts the spool 100 leftwardly to a point indicated at 156. Thereafter, with decreasing governor pressure in conduit 56, leftward motion of the spool passes back to the point 146 and is again positioned directly against the preconditioning spool 72.

FIG. 3 best illustrates the manner in which positive engagement or disengagement of the clutch 30 is established by fluid pressure acting upon opposed differential areas of the spool 100. The path of relative motion for the spool 100 as represented by the curve in FIG. 3 may be seen to generally conform to a "resilient hysteresis loop" for a resilient member such as a spring. Carrying this correlation further, it may be seen that movement of the spool from the point 148 to the point 150 occurs substantially at a constant pressure and thus may be termed "snap-action" movement of the spool 100. Similar "snapaction" movement of the spool occurs in a leftward direction from the point 154 to the point 156. Accordingly, the spool 100 is prevented from rapidly oscillating back and forth in the bore 64 and the clutch 30 is thereby prevented from oscillating between an engaged condition and a disengaged condition.

Finally, an additional feature of the invention is emphasized with reference to FIG. 6, which indicates that the transmission control 42 is effective to modulate fluid pressure from 0 to a selective value of 300 psi, for example, each time a new gear or speed ratio is established in the transmission speed ratio section 14. Since that same fluid pressure is transmitted to the preconditioning valve 58 through the shuttle valve 90 and conduit 92, the clutch 30 is allowed to disengage during each transient condition for the transmission speed ratio section 14. Accordingly, in the relatively higher speed gears 3–7, the clutch immediately reengages, but in the process acts as a cushion to prevent harsh shifting within the transmission assembly.

What is claimed is:

1. A transmission assembly comprising
a torque converter for coupling a power input member with a transmission speed ratio section, hydraulically actuated lock-up clutch arranged to selectively by-pass the torque converter and effectively couple the input means directly with the transmission speed ratio section, and
a control valve assembly for regulating engagement of the clutch, the control valve assembly, including a source of fluid under pressure
a control valve for selectively communicating the clutch with the source and with a fluid drain,
the control valve including a valve body having a bore, a control spool being movable in the bore to communicate the clutch with the source or drain and resilient means urging the spool toward a position where the clutch is in communication with the drain,
speed sensing means providing a fluid signal having a pressure proportional to rotating speed of a member in the transmission assembly,
conditioning means operatively communicating the fluid signal to the control valve in response to the transmission speed ratio section having a selected speed gear or relatively higher speed ratio established therein, the control valve being responsive to the fluid signal for effecting both disengagement and engagement of the clutch in the selected speed gear, the control valve being responsive to the fluid signal for maintaining engagement of the clutch in each of the relatively higher speed gears, the conditioning means operatively communicating the fluid signal into the bore to act on one end of the control spool and urge it against the resilient means, and
means tending to maintain positive engagement or disengagement of the clutch, the means for maintaining positive engagement or disengagement of the clutch comprising a reaction piston slidably arranged in a bore of effectively reduced diameter at the other end of the control spool to form a reaction chamber therein and means for selectively communicating the chamber with the fluid signal from the speed sensing means and with a fluid drain.

2. The transmission assembly of claim 1 wherein the transmission speed ratio section comprises a plurality of clutches and a speed ratio valve means for selectively engaging the clutches to establish the speed gears, the conditioning means being responsive to the speed ratio valve means for disengaging the clutch during each shift between speed gears.

3. The transmission assembly of claim 2 wherein the transmission speed ratio section also provides a speed gear relatively lower than the selected speed gear, the speed sensing means providing a fluid signal which is ineffective to operate the conditioning means during operation with the relatively lower speed gear established in the transmission speed ratio section.

4. The transmission assembly of claim 1 wherein the conditioning means comprises a resiliently positioned conditioning spool arranged in axial alignment with the one end of the control spool, the conditioning spool being responsive to fluid pressure established by the transmission speed ratio section for directing the fluid signal from the speed sensing means to effectively act against the one end of the control speed.

5. The transmission assembly of claim 1 further comprising means defining a restrictive orifice for communicating the reaction chamber with the speed sensing means.

6. In a transmission assembly including a torque converter for coupling a power input member with a transmission speed ratio section, a hydraulically actuated lock-up clutch arranged to selectively bypass the torque converter and effectively couple the input member directly with the transmission speed ratio section and a speed sensing means providing a fluid signal having a pressure proportional to rotating speed of a member in the transmission assembly, a control valve assembly for positively regulating engagement and disengagement of the clutch, the control valve assembly comprising a source of fluid under pressure, and a control valve communicating the clutch with the source and with a fluid drain, the control valve being responsive to the fluid signal from the speed sensing means for effecting both disengagement and engagement of the clutch, the control valve having a valve body defining a bore wherein a control spool is movable to selectively communicate the clutch with the source and the fluid drain, resilient means urging the spool toward a position for communicating the clutch with the drain, the spool including means having a relatively large effective surface communicated with the fluid signal whereupon the control spool is urged against the resilient means toward a position for communicating the clutch with the fluid source, the control spool also including means having a relatively smaller effective surface in communication with a reaction chamber, the reaction chamber being in selective communication with the fluid signal from the speed sensing means and a fluid drain during movement of the control spool in its bore.

7. The transmission assembly of claim 6 further comprising means defining a restrictive orifice for communicating the reaction chamber with the speed sensing means.

8. The transmission assembly of claim 6 further comprising conditioning means operatively communicating the fluid signal to effectively act against the one end of the control spool in response to the transmission speed ratio section having a selected speed gear of relatively higher speed gear established therein, the control spool being responsive to the fluid signal for maintaining engagement of the clutch in each of the relatively higher speed gears.

9. The transmission assembly of claim 8 wherein the transmission speed ratio section comprises a plurality of clutches and speed ratio valve means for selectively engaging the clutches to establish the speed gears, the conditioning means being responsive to the speed ratio valve means for disengaging the clutch during each shift between speed gears.

10. The transmission assembly of claim 6 wherein the transmission speed ratio section comprises a plurality of clutches which are selectively and hydraulically engaged to establish the speed ratios, the control spool being operatively responsive to hydraulic engagement of the clutches for communicating the clutch with the fluid drain during each shift between speed ratios.

* * * * *